US008939607B2

(12) United States Patent
Casper et al.

(10) Patent No.: US 8,939,607 B2
(45) Date of Patent: Jan. 27, 2015

(54) OPTICAL DEVICE, LIGHTING DEVICE AND SYSTEM FOR INTERCANOPY LIGHTING

(75) Inventors: Lars Christian Casper, Den Bosch (NL); Christina Tanase, Eidhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 273 days.

(21) Appl. No.: 13/581,585

(22) PCT Filed: Feb. 23, 2011

(86) PCT No.: PCT/IB2011/050748
§ 371 (c)(1),
(2), (4) Date: Aug. 28, 2012

(87) PCT Pub. No.: WO2011/107901
PCT Pub. Date: Sep. 9, 2011

(65) Prior Publication Data
US 2012/0320570 A1     Dec. 20, 2012

(30) Foreign Application Priority Data
Mar. 2, 2010   (EP) .................................... 10155114

(51) Int. Cl.
| F21V 7/04 | (2006.01) |
| F21V 13/00 | (2006.01) |
| F21V 7/00 | (2006.01) |
| A01G 9/24 | (2006.01) |
| F21V 5/04 | (2006.01) |
| F21V 7/09 | (2006.01) |
| F21V 21/14 | (2006.01) |
| F21Y 101/02 | (2006.01) |
| F21Y 113/00 | (2006.01) |

(52) U.S. Cl.
CPC .............. *F21V 7/0091* (2013.01); *A01G 9/243* (2013.01); *F21V 5/04* (2013.01); *F21V 7/09* (2013.01); *F21V 21/14* (2013.01); *F21Y 2101/02* (2013.01); *F21Y 2113/005* (2013.01)
USPC ..................................... 362/241; 362/296.05

(58) Field of Classification Search
USPC ........ 362/122, 236, 237, 241, 296.01, 296.05
See application file for complete search history.

(56) References Cited

U.S. PATENT DOCUMENTS

2005/0205878 A1    9/2005  Kan
2013/0301240 A1*  11/2013  Liu et al. ...................... 362/97.1

FOREIGN PATENT DOCUMENTS

EP            1600688 A1    5/2005
JP         2004166638 A    6/2004
(Continued)

*Primary Examiner* — David V Bruce
(74) *Attorney, Agent, or Firm* — Meenakshy Chakravorty

(57) ABSTRACT

This invention relates to an optical device (100) for intercanopy lighting comprising a light input area (109) for receiving light, a first surface (120) having a first bezier curve, and a second surface (110) having a second bezier curve. The first and second bezier curves are independently selected with respect to each other, and arranged such that the optical device is rotational asymmetric with respect to its center axis. Received light which is reflected in the first surface is reflected in a direction towards the center axis, and received light which is reflected in the second surface is reflected in a direction away from the center axis, thereby providing vertical and horizontal homogeneous illumination distribution in a predefined area, which area is illuminated under an angle. Thus, a vertical intensity distribution can be selected to be narrow, while simultaneously the horizontal intensity can be selected to be wide, which is advantageous for providing intercanopy lighting at a desired target zone for plants. Simultaneously, the vertical intensity distribution is asymmetric, which is advantageous for meeting homogeneity criteria for lighting of plants.

15 Claims, 4 Drawing Sheets

(56) References Cited

FOREIGN PATENT DOCUMENTS

| | | | |
|---|---|---|---|
| JP | 2008103300 | A | 5/2008 |
| WO | 2009024918 | A1 | 2/2009 |
| WO | 2009053533 | A1 | 4/2009 |

\* cited by examiner

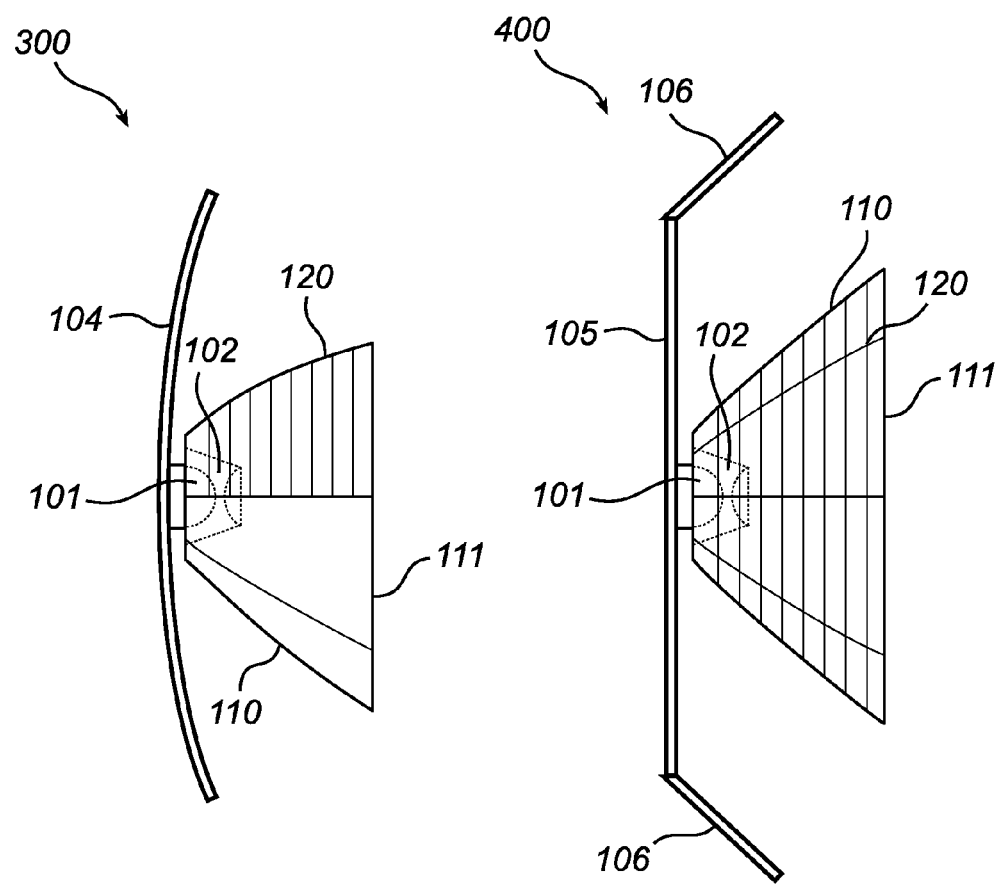

US 8,939,607 B2

OPTICAL DEVICE, LIGHTING DEVICE AND SYSTEM FOR INTERCANOPY LIGHTING

FIELD OF THE INVENTION

The present invention relates to an optical device, a corresponding lighting device and lighting system for intercanopy lighting, and more particularly to intercanopy lighting providing vertical and horizontal homogeneous illumination distribution in a predefined target zone of a plant.

BACKGROUND OF THE INVENTION

In order to increase the yield of crops in greenhouses, supplemental assimilation light is employed next to the natural sunlight. In particular high-intensity discharge lamps, HID lamps, such as SON-T, with an electrical power of 600-1000 W, are employed. As a result, the light level in a greenhouse increases, leading to a higher yield of crop produced per square-meter greenhouse area when compared to greenhouses working only with sunlight. However, plants like tomatoes or cucumbers grow to a height of several meters. In such a case, the upper leaves, being closest to the light source, absorb most of the incident light. The shadow zone formed in this way leads to less efficient use of the lower leaves to photosynthesis and consequently less production. To further increase the yield of crop per square meter greenhouse area, additional assimilation light sources illuminate plants in the shadow zone. This lighting concept is known as intercanopy lighting.

Efficient intercanopy lighting is typically realized by illuminating the plants in a vertical zone that starts in the lowest part of the plant where leafs develop and that stops approximately 0.5 m below the top of the plant. Light reaching the parts of the plant outside of this vertical zone is either lost towards the floor or ceiling or reaches parts of the plant that are already sufficiently illuminated by luminaries positioned above the plant.

Typically, the intercanopy lighting is provided by arranging HID lamps between rows of plants, such as tomatoes or cucumbers, with a predetermined distance from the plant row of typically between 40 cm and 1.0 m with a distance to neighboring lamps of typically 1.9 m. Theses geometric conditions in combination with the lamebrain light distribution of these lamps result in strongly varying horizontal and vertical irradiance on the plant surface. Further, by arranging the lamps between the rows of plants, the intercanopy lighting blocks the working area that has to be accessible to the workers of the greenhouse. Retractable HID lamp systems are known, in which the lamps are temporarily retracted to clear the working area for access by the workers. Subsequently the lamps have to be repositioned to provide the intercanopy lighting.

SUMMARY OF THE INVENTION

It is an object of the present invention to overcome the problems of prior art as discussed above, and to provide an alternative and improved optical device, lighting device and system for intercanopy lighting of plants in a greenhouse. A further object of the invention is to provide vertical and horizontal homogeneous illumination distribution in a predefined target zone when the target zone is illuminated under an angle.

The present invention provides an optical device, a lighting device and a lighting system for intercanopy lighting of plants, that produces an asymmetric illumination pattern with respect to the vertical and horizontal direction.

According to a first aspect of the invention, this and other objects are achieved by an optical device for intercanopy lighting, comprising a light input area for receiving light from a light source, a first surface having a first bezier curve, and a second surface having a second bezier curve. The first and second bezier curves are independently selected with respect to each other, and arranged such that the optical device is rotational asymmetric with respect to its centre axis. Received light which is reflected in the first surface is reflected in a direction towards the centre axis, and received light being reflected in the second surface is reflected in a direction away from the centre axis, thereby providing vertical and horizontal homogeneous illumination distribution in a predefined area, which area is illuminated under an angle.

Thus, there is provided an optical device for providing a collimation and asymmetric distribution of light which is advantageous and is arranged such to create an asymmetric intensity distribution of the light in two senses. Firstly, the optical device is arranged such that the width of the vertical and horizontal distribution of light exiting the optical device, are considerably different. The vertical intensity distribution can be selected to be narrow, while simultaneously the horizontal intensity can be selected to be wide, which is advantageous for providing intercanopy lighting for plants, within a desired and specified zone, a predefined area, called the target zone. In particular, the target zone is defined by the total width of the plant and a sub portion of the height, beginning at a specified minimal distance from the ground. Secondly, and simultaneously, the vertical intensity distribution is asymmetric, e.g. more light can be directed downwards than upwards. Thus, horizontal homogeneous illumination distribution in the predefined target zone when illuminated under an angle is advantageously achieved. This is advantageous when providing lighting that must meet homogeneity criteria for lighting of plants.

In accordance with an embodiment of the optical device, the first and second surfaces reflect light by means of total internal reflection, TIR. Thus, a compact optical device is advantageously provided.

In accordance with an embodiment of the optical device, the optical device comprises an optical element arranged at the light input area. The optical element is a cone shaped truncated lens arranged with its base at the light input area. The truncation of the lens is concave. Thereby, the optical element is arranged such that light entering the optical element and traveling along a direction towards the light output surface is collimated, while light traveling in a direction towards the sides of the optical element is directed towards the first and second surfaces. The efficiency of the optical device is thereby increased as the light entering via the light input area is collimated to be more efficiently distributed towards a light output facet of the optical device. This assures that no light hits the first and second surface after the lens. Thereby, light that would otherwise spread out in the vertical direction reaches the target zone.

In accordance with an embodiment of the optical device, it comprises an optical element arranged at the light input area, which optical element is arranged to redirect the received light in an asymmetric manner, by being arranged comprising one of an asymmetric free-form shaped portion, a displaced cylindrical shaped portion, an elliptical shaped portion or a tilted elliptical shaped portion.

According to a second aspect of the invention, there is provided a lighting device for intercanopy lighting of a plant comprising at least one light source arranged on a substrate, and an optical device according to the present invention. The optical device is arranged to receive light from the at least one light source. The predetermined area is a predetermined target zone of the plant. Thereby, vertical and horizontal homogeneous illumination distribution in the target zone of the plant is provided. Due to the asymmetric intensity distribution of the light in the two senses as described above for the optical device, the first and second surface may be selected such that the target zone receives homogenous illumination even when being illuminated under an angle.

In accordance with an embodiment of the lighting device, a height of the predetermined target zone for adolescent plants is selected to cover 100% of the plant height. For full grown plants, the height of the predetermined target zone is selected to cover a range of 10%-50% of the plant height, which is advantageous for providing high yield of crop.

In accordance with an embodiment of the lighting device, the substrate is arranged to be specular reflective. This provides an efficient redirection of recycled light reflected back towards the plant.

In accordance with an embodiment of the lighting device, the substrate comprises a reflective layer of metal, which provides an increase in optical efficiency. The metal layer may be any suitable metal like Al, Ag, etc.

In accordance with an embodiment of the lighting device, the substrate has a shape of one of flat, parabolic, conical shape, combined flat with flat tilted walls, combined flat with parabolic walls, and combined flat with Bezier shaped walls. Providing suitable shaping to the substrate increases the optical efficiency which is advantageous.

In accordance with an embodiment of the lighting device, the light source is a light emitting diode. The lighting device is advantageously used to confine the light emitted by light emitting diodes to a narrow zone, called target zone. To provide light applicable for intercanopy lighting of plants preferably medium power or high-power LEDs are used.

In accordance with an embodiment of the lighting device, a plurality of light sources are utilized in the device. The light sources are arranged to emit a combination of red and blue light or a combination of red and white light. Depending on the type of plant, 5%-20% of the optical power that reaches the plant should be blue. In particular, the light sources are distributed in the lighting device in a way that the plurality of colors is mixed thoroughly when reaching the plant.

According to a third aspect of the invention, there is provided a system for intercanopy lighting of plants. The system comprises a plurality of lighting devices according to present invention, means for arranging the lighting devices at a predetermined height, $h_0$, and a predetermined horizontal distance, $d_0$, with respect to a predetermined target zone of the plants, such that the lighting devices are arranged to provide an homogenous and directed beam pattern for illumination of the predetermined target zone of the plants.

In accordance with an embodiment of the system, the height of the predetermined target zone is selected within a range of 10-50% of the height of the full-grown plants, and 100% of the adolescent plants.

In accordance with an embodiment of the system, the horizontal distance, $d_0$, is selected within a range of 1.0-3.0 m, which is advantageous as this provides a sufficient working area for the greenhouse staff.

In accordance with an embodiment of the system, the system is movably arranged such that it can be lifted up and down.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

FIG. 3a) is a schematic cross-sectional side view of an embodiment of a lighting device according to the present invention, and b) is a schematic cross-sectional top view of an embodiment of a lighting device according to the present invention.

DETAILED DESCRIPTION

Embodiments according to the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

In the following description, optical efficiency is defined as the amount of light reaching the plant with respect to the amount of light emitted by a light source used to illuminate the target zone of the plant. The width (i.e., the horizontal extension) of the target zone is any typical width of a row of plants in a greenhouse, i.e., it can range between 5 m and 70 m. Further, any light sources referred to hereinafter is represented by light emitting diodes, LEDs. However, any other suitable light sources are applicable within the scope of the present invention.

Homogeneous is in this application defined according to the following. Within the target zone, we can find a minimum illuminance, $E_{min}$ and a maximum illuminance, $E_{max}$, as well as for a vertical cross section as well as for a horizontal cross section. A homogenous illuminance corresponds to that for both cross sections, the ratio, $(E_{min}/E_{max})\_v,h$ (v: vertical, h: horizontal) should be at least 0.7.

Figure 1:
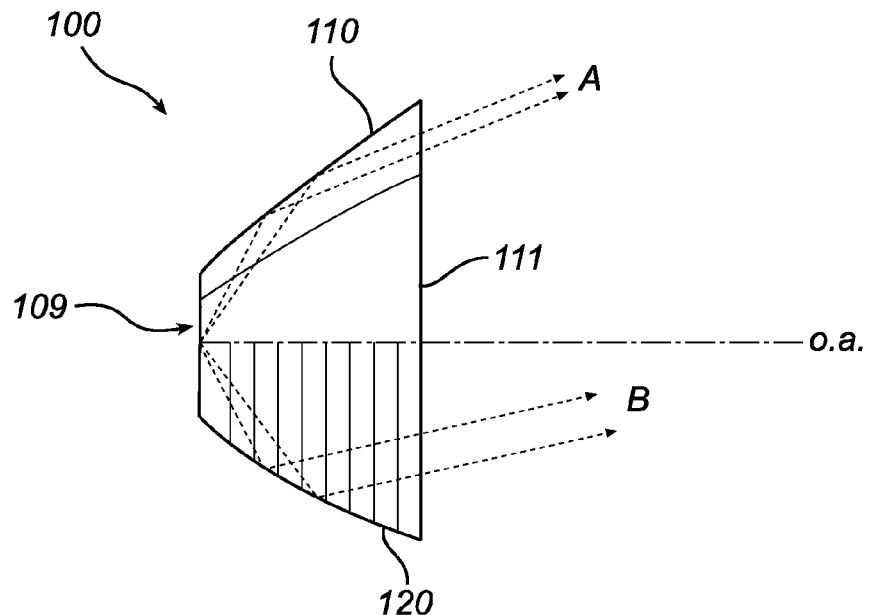
FIG. 1 is a schematic cross-sectional side view of an embodiment of an optical device according to the present invention.

FIG. 1, shows an optical device 100 with a light input area 109 and a light output area 111. The optical device 100 is centered along the optical axis o.a. The optical device 100 has a first surface 120, extending from the light input area 109 to the light output area 111. Further, the first surface 100 has a shape defined by a first bezier curve. The optical device 100 has a second surface 110, extending from the light input area 109 to the light output area 111. The second surface 110 is defined by a second Bezier curve. The first and second Bezier curves are independently selected with respect to each other. The first surface 120 and the second surface 110 are surfaces which are described by rational quadratic Bezier curves. This means that every curve is described by a starting point, $P_0$, an end point, $P_2$, and a control point, $P_1$, that lies not on the direct connection between $P_0$ and $P_1$. For the optical device 100, $P_0$ defines the start radius and $P_2$ the end radius. The point $P_1$ defines the curvature. Furthermore, the rational Bezier curve employed makes use of two weight parameters that lie between 0 and 1. This way, more freedom to the possible curvatures is given. The first surface 120 and the second surface 110, are arranged such that the optical device 100 is rotational asymmetric with respect to its centre axis.

The light input area 109 is arranged to receive light from a light source which is preferably arranged adjacent to the light input area. With reference to light beam B in FIG. 1, the Bezier curve of the first surface 120 is selected such that received light which is reflected in the first surface 120 is reflected in a direction towards the centre axis, light beam B. Further, the Bezier curve of the second surface 110 is selected such that received light which is reflected in the second surface 110 is reflected in a direction away from the centre axis, see light beam A.

Figures 2A, 2B:
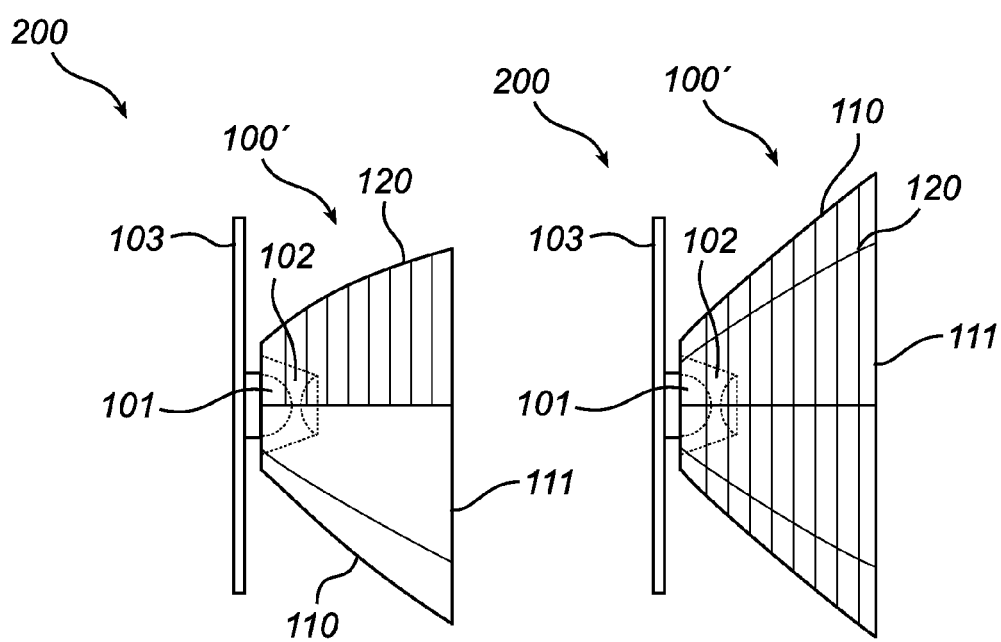
FIG. 2a) is a schematic cross-sectional side view of an embodiment of a lighting device according to the present invention, and b) is a schematic cross-sectional top view of the embodiment of a lighting device illustrated in FIG. 2a).

FIG. 2a) and b) show a lighting device 200, having a small light source, e.g. a light emitting diode (LED) 101, which is mounted on a substrate 103, and positioned adjacent to the light input area 109 of an optical device 100'. The LED 101 emits divergent light towards the light input area 109, and the light received in the optical device 100' is here collimated by an optical element, which is arranged in the optical device. The optical element is a collimator 102 arranged at the light input area 109. The collimator 102 is arranged as a cone shaped truncated lens, having its base at, or alternatively acting as, the light input area 109. The truncation of the lens is concave.

A first portion of the light exiting the collimator 102 on a side of the cone is incident on the first surface 120 (compare with beam B in FIG. 1) and is reflected by total internal reflection in a direction towards the centre axis and is then extracted out from the light output area 111.

Simultaneously, a second portion of the light exiting the collimator 102 on a side of the cone is incident on the second surface 110 (compare with beam A in FIG. 1) and is reflected by total internal reflection in a direction away from the centre axis and is then extracted out from the light output area 111. Light traveling in the forward direction substantially along the optic axis of the device, thus towards the light output area 111, the exit facet of the optical device, is collimated by the collimator 102. Light exiting towards the first surface 110 and second surface 120 is not collimated. So in summary, the collimator 102 reduces the angular spread in forward direction that would not be reflected by the first and second surfaces 120, 110, and that would otherwise be uncollimated while it doesn't influence the angular spread sideways.

The first light beam and the second light beam have different light intensity distributions (compare to A and B in FIG. 1), and the total light intensity distribution of light being extracted from the light output area 111 is a superposition of the first and second portions of light (and in addition any light leaving the optical device 100' without being reflected in the first and second surface). The outputted light is a homogenous and directed beam pattern, which is suitable e.g. for covering a predetermined target zone of a plant. The generated intensity distribution (lm/sr) in the vertical direction differs considerably from the horizontal direction. Additionally, the arrangement provides a vertical intensity distribution which in itself is asymmetric, in a sense that more light is directed at a lower part of a target zone than towards an upper part of a target or vice versa, depending on the orientation chosen for the optical device.

In alternative embodiments of the optical element, the optical element is arranged to redirect light from the light source in an asymmetric manner. This may be done by arranging an aspherically shaped lens (not shown) in the truncated section of the collimator.

The substrate 103 is in embodiments of the lighting device 200 manufactured by applying a specular reflecting material or a reflective layer, e.g. a metal layer, to the substrate. This way, light that is otherwise lost, e.g. by means of backscattering, is reflected by the substrate and is recycled and redirected towards the plant surface, when employing the lighting device as intercanopy lighting of a plant. Calculations show that by using an aluminum (Al) layer with 85% reflection, an optical efficiency of 90% is achievable for a system as described below with reference to FIG. 4 a)-c). Further, the shape of the substrate is advantageously arranged to increase the optical efficiency. FIG. 3a) illustrates a lighting device 300, having a substrate with parabolic shape 104 which is slightly collimating. Calculations show that by using such a slightly collimating substrate 104, optical efficiency above 90% is achievable for a system as described below with reference to FIG. 4 a)-c). Another, lighting device 400 as depicted in FIG. 3b has a substrate with a flat base 105 with flat tilted walls 106 arranged to reflect light towards the target zone. Other possible shapes of the substrate are cone shape, combined flat with parabolic walls, and combined flat with Bezier shaped walls (not shown).

One or more lighting devices according to the present invention may be arranged in a luminaire (not shown). Different colors of the light sources may be utilized, which is preferred when providing intercanopy lighting of plants. Typically, red and blue LEDs or white and red are utilized. The lighting devices spread the light in the horizontal direction such that the light, emitted by the blue and red or white and red LEDs which are distributed in the luminaire, is mixed thoroughly on the plant. Typically, 5%-20% of the irradiation on the plant should be blue.

Figure 4A:
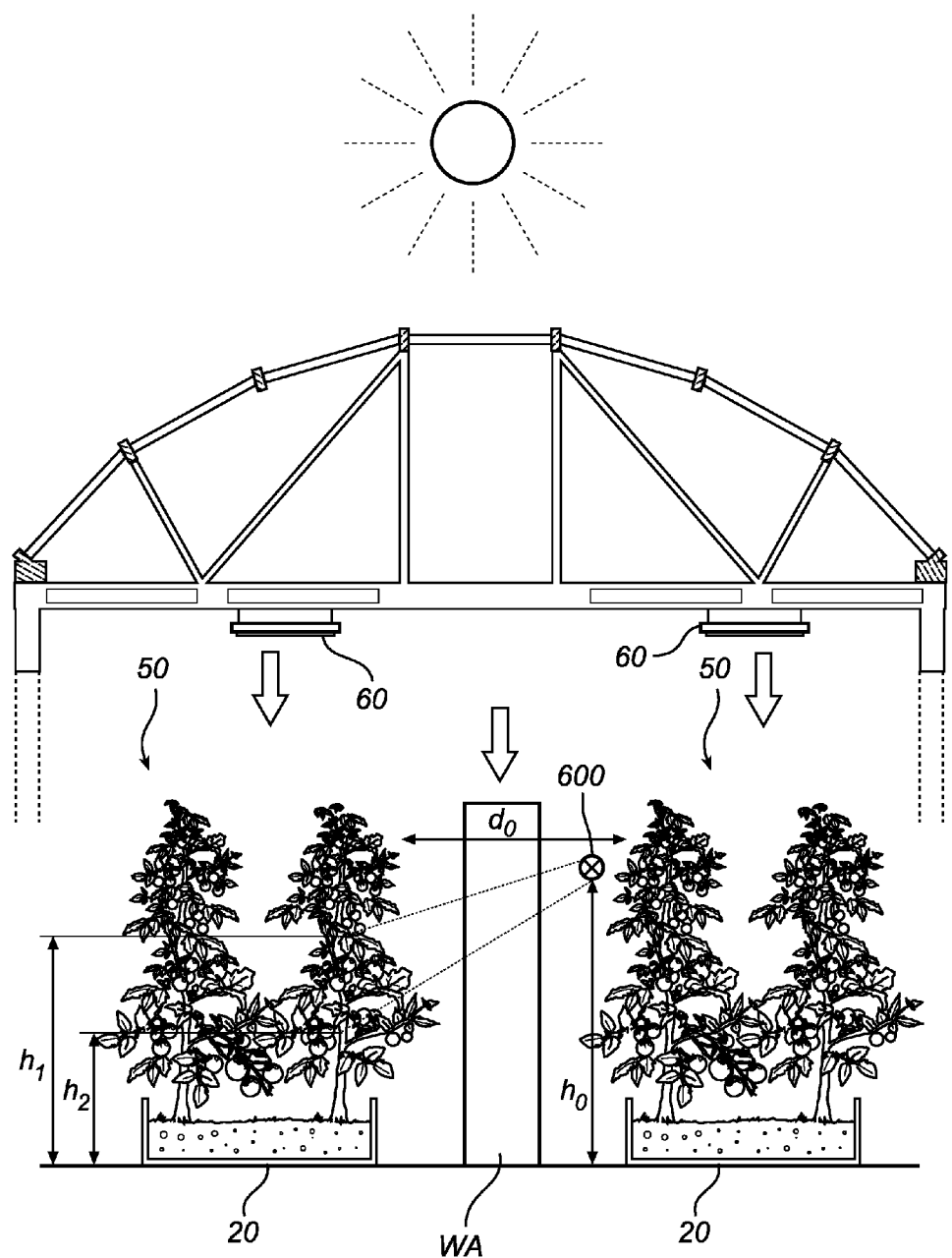
FIG. 4a) to c) are schematic cross-sectional side views, which illustrate embodiments of a lighting system according to the present invention.

In a greenhouse, controlled cultivation or protection of plants is provided. Referring now to FIG. 4a) in a greenhouse there are traditionally two main sources of illumination which are utilized, the sun and top illumination 60, which are typically ceiling mounted HID lamps. Further, to illustrate the present inventive concept, the general principle of an embodiment of a system for intercanopy lighting in accordance with the present invention is illustrated and in the FIGS. 4a) to c) possible positions of the lighting device (or luminaire as explained above) in the greenhouse. The system typically comprises a plurality of lighting devices or luminaires 600 which are arranged at a position defined by the predetermined height, $h_0$, to illuminate a target zone of the plants 50, which are typically arranged in rows of applicable cultivation beds 20. Here one luminaire 600 comprising a plurality of lighting devices, each arranged with one LED of applicable color (typically such to achieve a mixture of blue and red or white and red on the plant surface) is visible. The predetermined height $h_0$ is determined by the direction of the light from the lighting device. In FIG. 4a) the luminaire 600 distributes light approximately 28 degrees downwards, which renders the lighting device to be positioned higher than the target zone, which is governed by a lower height limit, $h_2$, and a higher height limit, $h_1$. Here the angle of the illumination is selected to 28 deg downwards, however the selected angle of the illumination is typically based on the specific kind of plant and the growth stadium of the plant. The height of the target zone, i.e. $h_1-h_2$, is typically selected within a range of 10-50% of the height of a full-grown plant and 100% for adolescent plants. In the first case the predetermined height is $h_0 > h_1$.

Figure 4B:
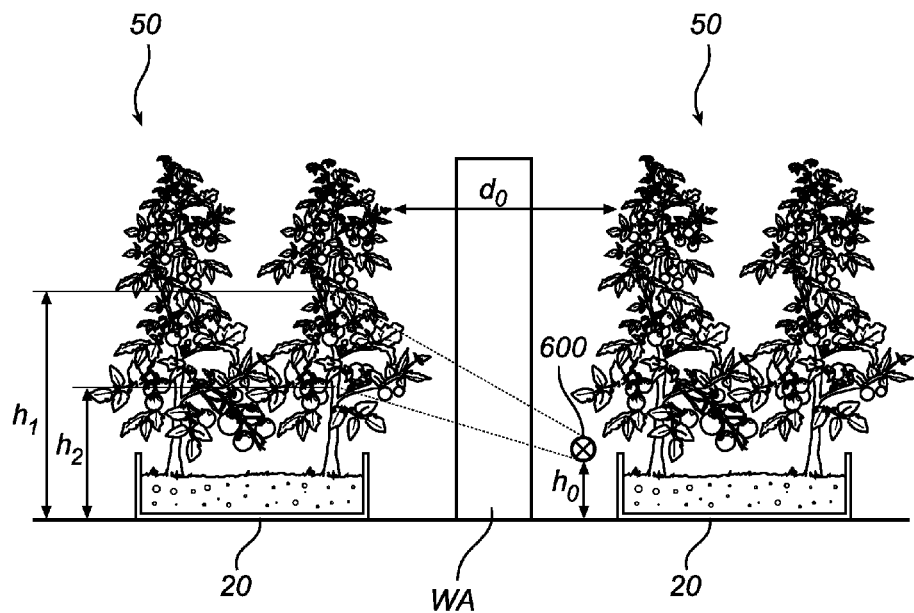
Figure 4C:
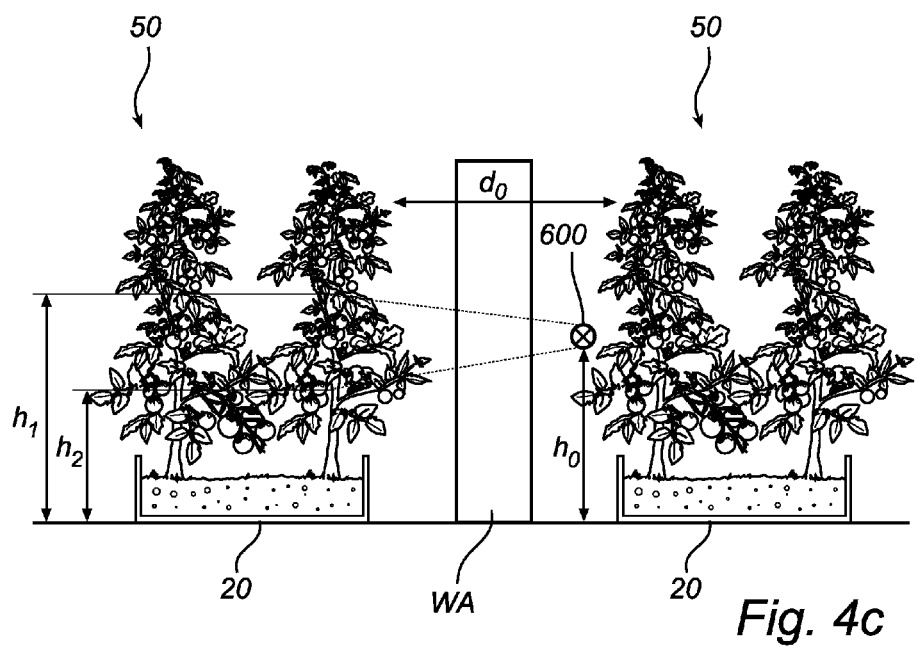

The lighting device is arranged at a horizontal distance $d_0$ from the target zone, which is chosen such that the luminaire 600 is located outside of the working area WA for the greenhouse staff. Due to the asymmetric shape of the lighting devices in the luminaire 600, the light is efficiently directed to the target zone, starting at height $h_1$ above ground and ending at height $h_2$. The target zone of the plant is thus irradiated under a vertical angle which here is approximately 28 degrees downwards. Another example is shown in FIG. 4b) where the target zone is irradiated under a vertical angle of approximately 45 degrees upwards. The vertical angle is greater than or equal to 0 deg. (0 deg means that the direction of the irradiation is parallel to the target zone normal, which is illustrated in FIG. 4c).

In the case of tomato plants, $h_1$ is in the order of 1.5-2.9 m, while $h_2$ is approximately 1.0 m. As a consequence, the target zone has in the vertical direction a size of 0.5-1.0 m. Under these circumstances, a system employing the lighting device which has no reflective substrate and that is positioned as shown in FIG. 4 can reach light target efficiencies of around 70%. As previously described the light target efficiencies may be considerably increased by employing a reflective substrate, which may optionally be shaped.

Typical separation between the lighting device and the target zone is 0.5 m-1.5 m (horizontal direction). Typical height for mounting of the lighting device is around 2.0 m—however other positions of the lighting devices are applicable for various vertical angles of the irradiation from the lighting devices/luminaires as was explained above. To avoid loss of light in other parts of the plants, in the vertical direction a strong collimation is required. Taken the given parameters for system above, the typical target zone corresponds to a beam width in the vertical direction from the lighting device/luminaire of approximately 20 degrees.

Above, embodiments of the optical device, lighting device and system according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising does not exclude other elements or steps, that the word "a or "an, does not exclude a plurality, which per se will be apparent to a person skilled in the art.

The invention claimed is:

1. An optical device for intercanopy lighting, comprising:
    a light input area for receiving light from a light source;
    a first surface having a first bezier curve; and
    a second surface having a second bezier curve,
said first and second bezier curves being independently selected with respect to each other, and arranged such that said optical device is rotational asymmetric with respect to its centre axis, wherein received light being reflected in said first surface is reflected in a direction towards said centre axis, and wherein received light being reflected in said second surface is reflected in a direction away from said centre axis, thereby providing vertical and horizontal homogeneous illumination distribution in a predefined area, said area being illuminated under an angle.

2. An optical device according to claim 1, wherein said first and second surfaces reflect light by means of total internal reflection.

3. An optical device according to claim 1, further comprising an optical element arranged at said light input area, wherein said optical element is a cone shaped truncated lens arranged with its base at said light input area, wherein the truncation of said lens is concave.

4. An optical device according to claim 1, further comprising an optical element arranged at said light input area, wherein said optical element is arranged to redirect said received light in an asymmetric manner, by being arranged comprising one of an asymmetric free-form shaped portion, a displaced cylindrical shaped portion, an elliptical shaped portion or a tilted elliptical shaped portion.

5. A lighting device for intercanopy lighting of a plant comprising:
    at least one light source arranged on a substrate; and
    an optical device according to claim 1, said optical device being arranged to receive light from said at least one light source, wherein said predetermined area is a predetermined target zone of said plant.

6. A lighting device according to claim 5, wherein a height of said predetermined target zone for adolescent plants is selected to cover 100% of the plant height, wherein for full grown plants, the height of said predetermined target zone is selected to cover a range of 10%-50% of the plant height.

7. A lighting device according to claim 5, wherein said substrate is arranged to be specular reflective.

8. A lighting device according to claim 7, wherein said substrate comprises a reflective layer of metal.

9. A lighting device according to claim 7, wherein said substrate has a shape of one of flat, parabolic, conical shape, combined flat with flat tilted walls, combined flat with parabolic walls, and combined flat with Bezier shaped walls.

10. A lighting device according to claim 5, wherein the light source is a light emitting diode.

11. A lighting device according to claim 5, wherein a plurality of light sources are utilized in the device, wherein said light sources are arranged to emit a combination of red and blue light, or a combination of red and white light.

12. A system for intercanopy lighting of plants, said system comprising:
    a plurality of lighting devices according to claims 5;
    means for arranging said lighting devices at a predetermined height $h_0$, and predetermined horizontal distance $d_0$ with respect to a predetermined target zone of said plants;
        wherein the lighting devices are arranged to provide an homogenous and directed beam pattern for illumination of said predetermined target zone of said plants.

13. A system according to claim 12, wherein the height of said predetermined target zone is selected within a range of 10-50% of the height of full-grown plants and 100% of adolescent plants.

14. A system according to claim 12, wherein said horizontal distance $d_0$ is selected within a range of 1.0-3.0 m.

15. A system according to claim 12, wherein said system is movably arranged such that it can be lifted up and down.

* * * * *